United States Patent
Song et al.

(12) 
(10) Patent No.: US 6,434,089 B1
(45) Date of Patent: Aug. 13, 2002

(54) METHOD FOR STORING DATA TO OPTICAL DISKS USING INTERLEAVING AND SEQUENTIAL MODES

(75) Inventors: Kye-Han Song, Sungnam; Hee-Joong Kang, Seoul, both of (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/246,149

(22) Filed: Feb. 8, 1999

(30) Foreign Application Priority Data

Feb. 6, 1998 (KR) .............................................. 98-3445

(51) Int. Cl.[7] .............................................. G11B 17/22
(52) U.S. Cl. .................................... 369/30.28; 707/204
(58) Field of Search .............................. 369/32, 13, 14, 369/34, 36, 38, 30.26, 30.28, 30.29, 30.3, 30.31, 30.32, 30.34; 386/95; 710/4; 707/201–205

(56) References Cited

U.S. PATENT DOCUMENTS 4,614,474 A * 9/1986 Sudo ........................... 414/281
4,787,074 A * 11/1988 Deck et al. ................... 369/36
4,987,533 A * 1/1991 Clark et al. .................. 707/204

FOREIGN PATENT DOCUMENTS

| JP | hei02-278440 | 11/1990 |
| JP | hei04-344920 | 12/1992 |
| JP | hei09-212404 | 8/1997 |

* cited by examiner

*Primary Examiner*—Ali Neyzari
(74) *Attorney, Agent, or Firm*—Robert E. Bushnell, Esq.

(57) ABSTRACT

A method for storing data by utilizing optical disks employs interleaving and sequential modes and a high watermark. The high watermark is a threshold value for an optical disk to a predefined portion of the total storage capacity, thereby insuring the existence of a spare capacity for each optical disk. A method combining the interleaving mode and the high watermark provides more efficient data storing and searching to the user, thereby reducing movement time of the optical disks and enabling many users to search for desired information on the optical disks in a more efficient manner.

18 Claims, 5 Drawing Sheets

METHOD FOR STORING DATA TO OPTICAL DISKS USING INTERLEAVING AND SEQUENTIAL MODES

CLAIM OF PRIORITY

This application makes reference to, incorporates the same herein, and claims all benefits accruing under 35 U.S.C. §119 from an application for METHOD FOR STORING DATA BY UTILIZING THE OPTICAL DISKS earlier filed in the Korean Industrial Property Office on the 6th of February 1998 and there duly assigned Ser. No. 3445/1998.

BACKGROUND OF THE INVENTION

1. Technical Field

The present invention is related to a method for storing data by utilizing optical disks. More specifically, the present invention relates to a method for storing to a database information on the use of the optical disks and the optical disks themselves, and providing interleaving and sequential modes and a high watermark when storing the data by utilizing a plurality of optical disks in a juke box.

2. Related Art

Jukeboxes are utilized in a document imaging system, document managing system, or backup system. The jukeboxes can use a plurality of optical disks in order to store data of huge capacity. Both sides of the optical disks can be used to store the data. After a plurality of optical disks, comprising a logical volume, are inserted into optical disk drive(ODD), the data are stored, and subsequently the stored data are searched.

When many users request the jukebox to read the data stored on the opposite side of the present optical disk, the system must find the data storage side, and then frequently turn over and insert the optical disk.

When a specific optical disk is filled with data up to its available capacity, so that the optical disk has no more available capacity, storing additional data to the corresponding optical disk is impossible, and efficient management of the optical disk is impossible.

As a result of the latter problems, multiple disk systems have been developed. In such a system, when a first side of a two-sided disk is filled, further data is stored on the second side. Moreover, when both sides of a given disk are filled to capacity, a subsequent disk is selected for data storage on both sides thereof.

Inefficient disk management occurs when several users request data stored on different sides of different optical disks since turning over and insertion of different optical disks are required.

A prior art patent is U.S. Pat. No. 4,987,533 of Clark et al., which discloses a METHOD OF MANAGING DATA IN A DATA STORAGE HIERARCHY AND A DATA STORAGE HIERARCHY THEREFOR WITH REMOVAL OF THE LEAST RECENTLY MOUNTED MEDIUM to Clark et al. The method of this patent is different from the present invention, and is burdened by the disadvantages discussed herein.

SUMMARY OF THE INVENTION

It is an object of the present invention to provide a method for storing data up to a dynamically allocated size of an optical disk by providing a high watermark which controls storage capacity in a software method, and for storing additional related information to the identical optical disk.

In one aspect of the invention, a method for storing data by utilizing a plurality of optical disks designated as a logical storage volume comprises the steps of: inputting a storing mode of the optical disk; finding the optical disk for which the storing mode is inputted; appointing the storing mode to the optical disk if the optical disk is found; storing the appointed storing mode information to the storage volume information database; searching the storing mode information from the storage volume information database when a request to store data to the corresponding optical disk is made; checking the remaining empty capacity of the corresponding optical disk according to the searched storing mode; and storing data when the checked optical disk has remaining capacity (i.e., vacant capacity).

An optional storing mode of the optical disk comprises the steps of: (a) storing data to the side A (or front side) of the optical disk; (b) storing data to the side B (or rear side) of the corresponding optical disk when the side A is filled with data; and (c) performing a sequential mode by searching the next optical disk in order to store data according to the steps (a) and (b), when the side B of the optical disk is filled.

Another optional storing mode of the optical disk comprises the steps of: (1) receiving a user request to store data on an optical disk in the storage volume; (2) finding the optical disk on which to store the requested data on side A thereof; (3) storing data to side A of the found optical disk; (4) finding the next optical disk on which to store the requested data on side A thereof when side A of the present optical disk is full; (5) finding an optical disk having capability of storing data to side B thereof when the plurality of the side A's of the installed optical disks are full; (6) storing data to side B of the found optical disk; (7) finding the next optical disk on which to store the requested data to side B thereof when side B of the current optical disk is full; (8) requesting the user to install additional optical disks when no more vacant optical disks are found; and (9) performing an interleaving mode repeating the steps (1) to (8) when optical disks are found.

In the step of checking for remaining empty capacity, a threshold value indicating storage restriction is defined as a high watermark, and the high watermark is applied to each optical disk. The values of the high watermark are inputted by the user for each optical disk, and are stored to the storage media information database.

A method of storing the values of the high watermark comprises the steps of: inputting by the user of the value of the high watermark for an optical disk; searching an appointed optical disk; setting the value of the high watermark for the optical disk to the inputted value of the high watermark when a searched optical disk exists; and storing the set high watermark information to the storage media information database.

A method for storing data by utilizing the high watermark comprises the steps of: requesting to store data to an optical disk; comparing the capacity predefined by the high watermark to the sum of the used capacity of the corresponding optical disk and the requested capacity; storing data to the corresponding optical disk and computing the used capacity when the sum of the used capacity of the corresponding optical disk and the requested capacity is less than the capacity predefined by the high watermark; determining whether to append the data to an identical document when the sum of the used capacity of the corresponding optical disk and the requested capacity is not less than the capacity predefined by the high watermark; storing data to another available optical disk when not appending data to the identical document as a result of the previous determining step; comparing the sum of the used capacity of the optical disk and the requested capacity to the available capacity of the optical disk when appending data to an identical document as a result of the previous determining step; storing data to another available optical disk when the sum of the used capacity of the optical disk and the requested capacity is not less than the available capacity of the optical disk; and modifying the high watermark with the sum of the used capacity and the requested capacity and storing data to the optical disk when the sum of the used capacity of the optical disk and the requested capacity is not less than the available capacity of the optical disk.

In another aspect of the present invention, a method for storing data by utilizing a plurality of the optical disks designated as a logical storage volume comprises the steps of: (1) receiving a user request to store data to an optical disk in the storage volume; (2) finding an optical disk on which to store the requested data on side A thereof; (3) storing data to side A of the found optical disk; (4) finding a next optical disk on which to store the requested data on side A of thereof when side A of the current optical disk is full; (5) finding an optical disk having the capability of storing data on side B thereof when the plurality of the side A's of the installed optical disks are full; (6) storing data on side B of the found optical disk; (7) finding a next optical disk on which to store the requested data on side B thereof when side B of the current optical disk is full; (8) requesting the user to install additional optical disks when no more optical disks are found; and (9) repeating the steps (1) to (8) when optical disks are found.

In another aspect of the present invention, a method for storing data by utilizing the optical disks applies a high watermark to each optical disk in order to determine the volume available to store data, the high watermark being defined as a threshold value which designates a data storage restriction, and a plurality of the optical disks being designated as a logical volume.

A method to store the high watermark comprises the steps of: inputting by a user of a value of the high watermark for an optical disk; searching a designated optical disk; setting a value of the high watermark for the optical disk as the inputted value of the high watermark when a searched optical disk exists; and storing the set high watermark information to a storage media information database.

A method for storing data by utilizing the high watermark comprises the steps of: requesting to store data to the optical disk; comparing a capacity predefined by the high watermark to the sum of the used capacity of the corresponding optical disk and the requested capacity; storing data to the corresponding optical disk and computing the used capacity when the sum of the used capacity of the corresponding optical disk and the requested capacity is less than the capacity predefined by the high watermark; determining whether to append data to an identical document when the sum of the used capacity of the corresponding optical disk and the requested capacity is not less than the capacity predefined by the high watermark; storing the data to another available optical disk when not appending data to an identical document as a result of the previous determining step; comparing the sum of the used capacity of the optical disk and the requested capacity to the available capacity of the optical disk when appending data to an identical document as a result of the previous determining step; storing data to another available optical disk when the sum of the used capacity of the optical disk and the requested capacity is not less than the available capacity of the optical disk; and modifying the high watermark with the sum of the used capacity and the requested capacity, and storing data to the optical disk when the sum of the used capacity of the optical disk and the requested capacity is not less than the available capacity of the optical disk.

The high watermark for each optical disk is stored by the user to a storage media information database.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The present invention provides a storing method by means of an interleaving mode in combination with a sequential mode when storing data to a logical volume comprising a plurality of optical disks. In the interleaving mode, after all side A's of optical disks are used, the side B's of the optical disks are used. Through the above procedure, a plurality of users can concurrently utilize the optical disks.

When storing data to a side of an optical disk, a high watermark for controlling the storage capacity in a software method is utilized. Through this procedure, the optical disk is not fully used and, when appending data relating to stored information, the related information may be stored in an identical optical disk.

Figure 1A:
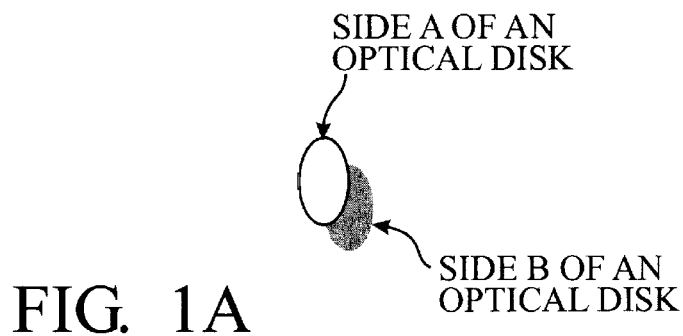
FIGS. 1A and 1B illustrate a method for utilizing optical disks.
Figure 1B:
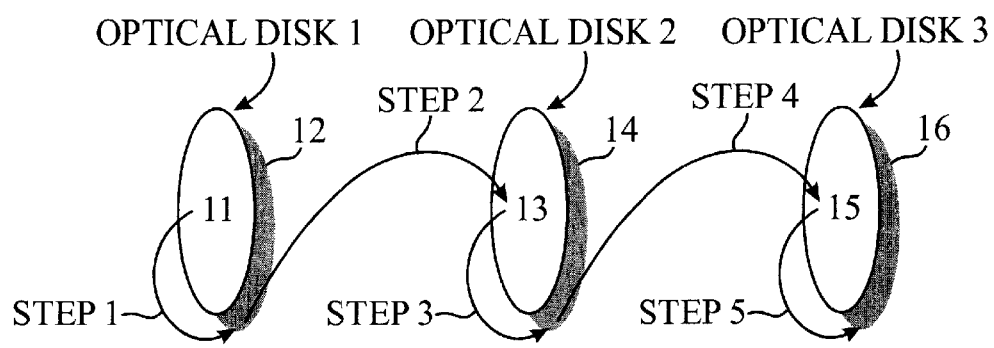

FIGS. 1A and 1B illustrate a method for utilizing optical disks. As illustrated, three optical disks comprising a logical volume are inserted into the ODD in due course so as to store the data. More specifically, FIGS. 1A and 1B show a method for storing the data to the optical disk by utilizing the sequential method. As seen in FIG. 1A, an optical disk has two sides, A and B. If each side of the optical disks is assumed to contain sufficient volume to store the data, then data is stored to the side 11 of the optical disk 1. When the side 11 is full, data is stored to the side 12 of the optical disk 1 (step 1). When the side 12 is full, data is stored to the side 13 of the optical disk 2 (step 2). When the side 13 is full, data is stored to the side 14 of the optical disk 2 (step 3). When the side 14 is full, data is stored to the side 15 of the optical disk 3 (step 4). Finally, when the side 15 is full, data is stored to the side 16 of the optical disk 3 (step 5).

Thus, when data is fully stored to a side A or side B up to its available capacity, if a user tries to store additional data related to the existing stored data to the identical side, he cannot store the data to the corresponding side of the optical disk. Therefore, the data must be stored to another side of the same optical disk or to another optical disk. Subsequently, when the user tries to search for the related information, he has to search many optical disks or stored sides, thereby increasing the search time.

In a jukebox system with a plurality of optical disks, when the data is stored to the optical disks sequentially, optical disk by optical disk, then when many users request data which are stored to the different sides of the optical disks, the jukebox sometimes has to turn over and insert the optical disks to search for the desired information.

Also, when a user tries to store additional data to an optical disk already filled to its available capacity, the data is stored to another side or to another optical disk because the data cannot be stored to the side of the optical disk containing the related information. Accordingly, the probability of changing optical disks increases, thereby preventing efficient management of the optical disks.

Figure 2:
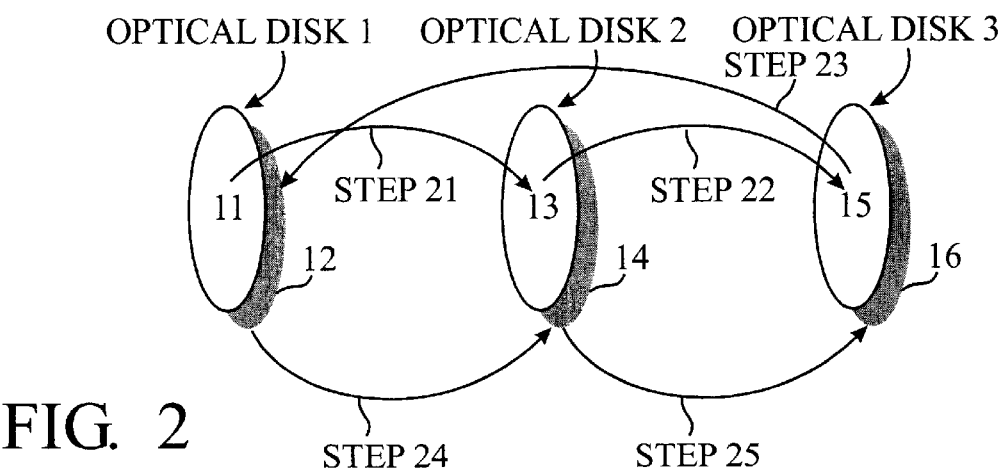
FIG. 2 illustrates a schematic diagram for storing data by utilizing optical disks according to the present invention.

FIG. 2 illustrates a method for storing data by utilizing optical disks according to the present invention. A plurality of optical disks may be utilized but, for convenience of explanation, the number of the optical disks is set to three. Thus, an arrangement of optical disks 1, 2 and 3 having sides 11, 12, 13, 14, 15 and 16 (similar to FIG. 1B) are shown in FIG. 2.

As illustrated, in a logical volume comprising the three optical disks, a side on which to store data is assigned by utilizing an interleaving mode. The side A's are assigned and, through steps 21 and 22, the data is stored to the side A's. When all side A's are used, then the side B's are assigned and, through steps 23, 24, and 25, the data is stored to the side B's.

Figure 3:
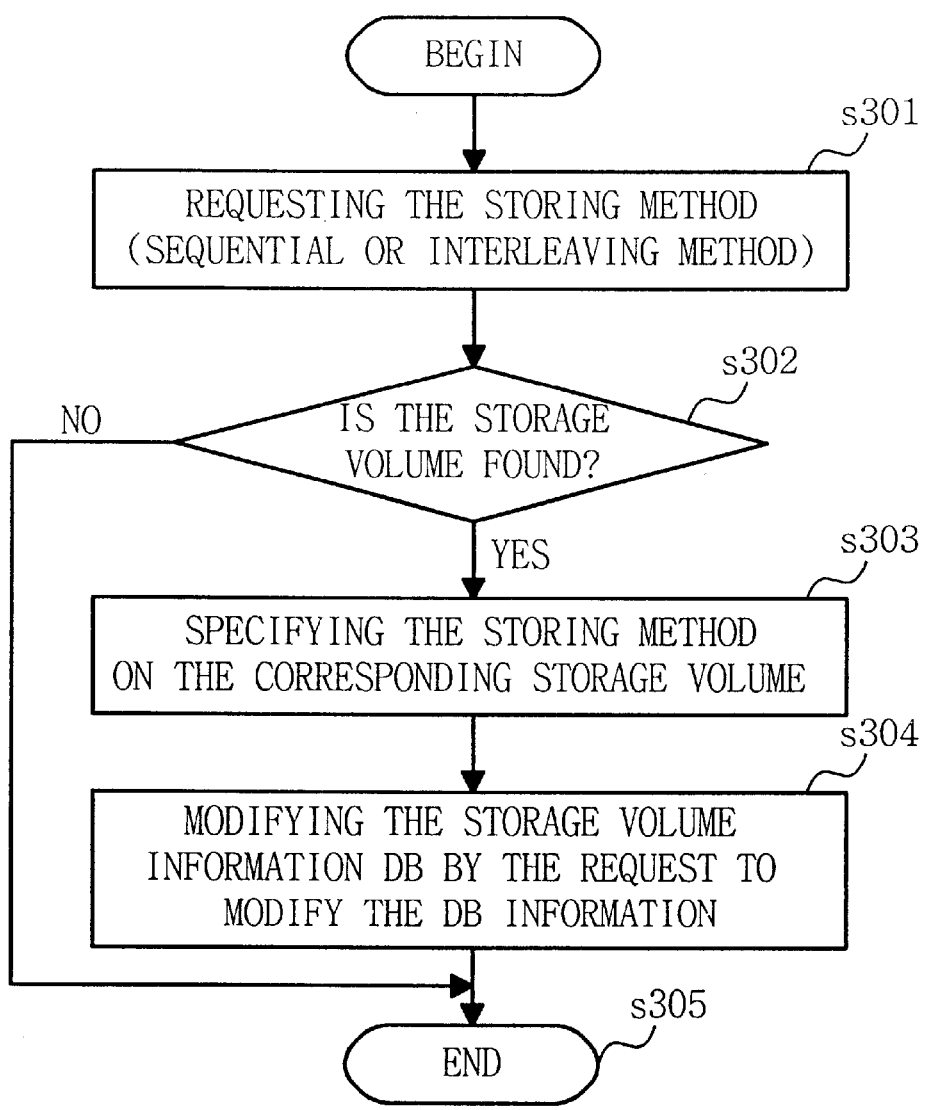
FIG. 3 illustrates a flow chart for assigning a storing mode of the optical disks according to the present invention.

FIG. 3 illustrates a method for assigning a storing volume and a corresponding storing mode of the optical disks according to the present invention. The storing mode (sequential or interleaving) is requested in step s301. A volume for storing the data is found in step s302. If the volume is found, the information (sequential or interleaving) relating to the storing mode is assigned in step s303, and the information is stored to the storage volume information database by a request for modifying the database information in step s304. If the volume is not found, the process is terminated in step s305.

After the storing mode is assigned, when the request to store data to the storage volume occurs, an optical disk is selected according to the assigned storing mode and the data is stored by the sequential or interleaving mode.

Figure 4:
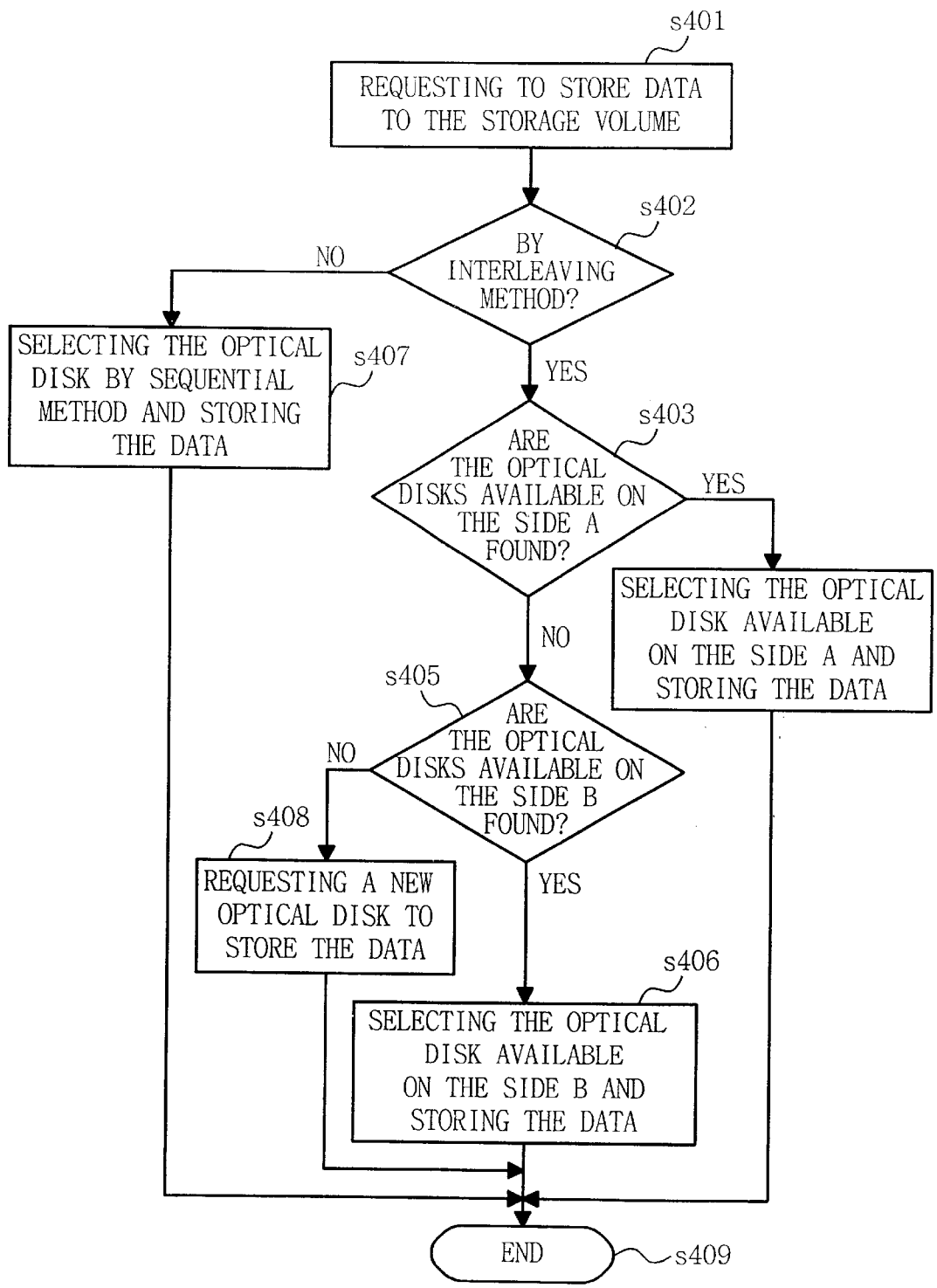
FIG. 4 illustrates a flow chart for storing data by an interleaving mode according to the present invention.

FIG. 4 illustrates a method for storing the data by the interleaving mode according to the present invention.

If the request to store data to an optical disk having available storage capacity occurs in step s401, the storage mode (sequential or interleaving) is checked in step s402. If not utilizing the interleaving mode, the data is stored to the optical disk by utilizing the sequential mode in step s407. If utilizing the interleaving mode, the optical disk available for side A is found in step s403. If the optical disk available for side A exists, the corresponding optical disk is selected and the data is stored in step s404.

When all the optical disks available for side A are filled with data, the optical disks available for side B are found in step s405. If the optical disks available for side B are found, the found optical disks are selected and the data is stored in step s406. But, if the optical disks available for side B are not found, an additional optical disk is requested in step s408.

When utilizing the above mode, the user can easily use and modify the information on the storage modes because a capability of displaying the information on the storage mode of the present storage volume can be provided.

In the procedure of finding available optical disks, a determination must be made as to whether or not the side of the found optical disk has additional storage capacity. In this case, the high watermark function is adopted. The high watermark is a threshold value indicating the capacity to store data on each optical disk. For example, if the high watermark is set at 90%, then an optical disk with the high watermark of 90% stores data up to 90% of its capacity, and 10% of the capacity remains as a spare capacity.

Figure 5:
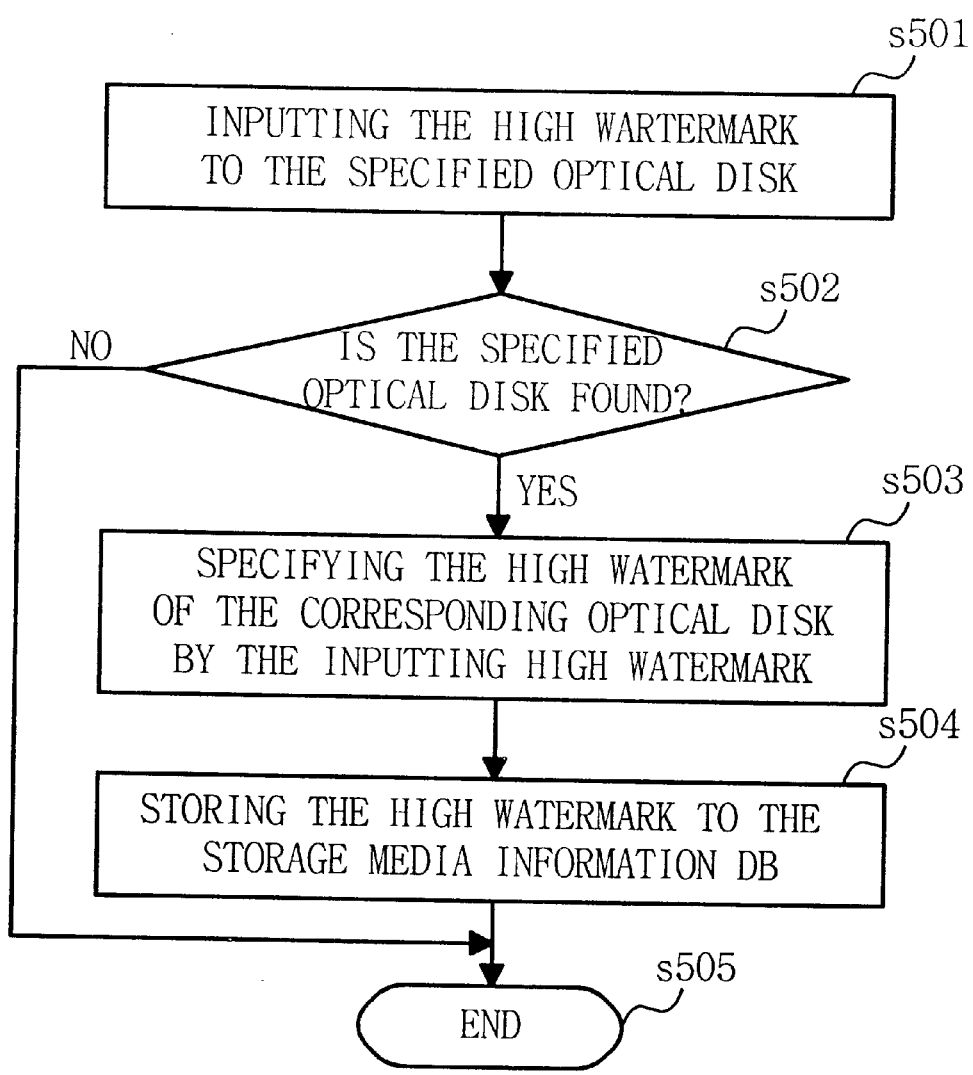
FIG. 5 illustrates a flow chart for assigning a high watermark to an optical disk according to the present invention.

FIG. 5 illustrates a method for assigning a high watermark to a specified optical disk according to the present invention.

If a high watermark of an optical disk for storing the data is inputted in step s501, the specified optical disk is found in step s502. If the specified optical disk is not found, the process is terminated (since the corresponding optical disk does not exist) in step s505. If the specified optical disk is found, the inputted high watermark is set as the high watermark of the corresponding optical disk in step s503. The information on this function is stored to the storage media information database by a request to modify the database information in step s504.

When the capacity specified by high watermark is identical to the total available storage capacity of the optical disk (that is, the high watermark is 100%), then the sequential mode is used. Except for the above case, the capacity to store data cannot exceed the high watermark.

Therefore, the reason for adopting the high watermark for the storage side of an optical disk is to obtain spare capacity to store additional data to the identical side of the optical disk, to the extent that it is possible, when trying to store additional data which is related to existing stored data.

Figure 6:
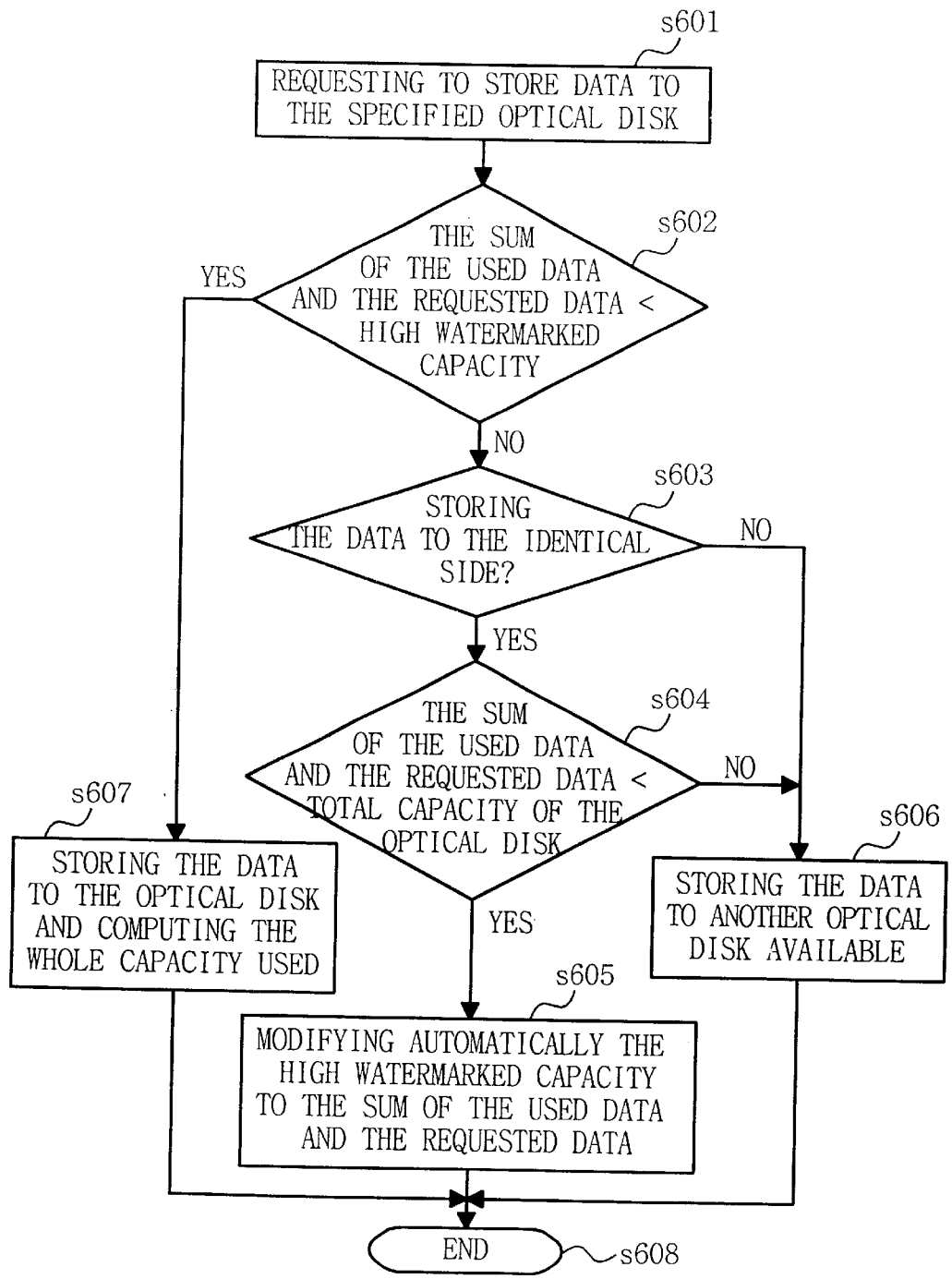
FIG. 6 illustrates a flow chart for storing data by utilizing a high watermark for an optical disk according to the present invention.

FIG. 6 illustrates a method for storing data by utilizing a high watermark for the optical disk according to the present invention.

If a request to store data to an optical disk occurs in step s601, the stored high watermark is read from the storage media information database by a request to search the database information, and the sum of the data used at the corresponding optical disk and the requested data is compared to the capacity assigned by the high watermark in step s602. After the latter data are compared, if the capacity assigned by the high watermark is greater than the sum of the data used at the corresponding optical disk and the requested data, then the data is stored to the optical disk, and the total used capacity is computed in step s607 (since this means that the optical disk has sufficient empty capacity).

After the above data are compared, if the capacity assigned by the high watermark is equal to or less than the sum of the data used at the corresponding optical disk and the requested data, this means that the capacity specified by the high watermark is fully occupied. Therefore, it must be determined whether the above request applies to a case in which data must be stored to an identical side of an optical display modifying the high watermark (e.g., when storing data, related to existing stored data, to an identical side) in step s603.

If, based on the latter determination, it is not necessary to store the data to an identical side, then the data is stored to another available optical disk in step s606.

Furthermore, if it is not necessary to store data to an identical side, then the sum of the data used at the corresponding optical disk and the requested capacity is compared to the available capacity of the optical disk in step s604.

If, based on the latter comparison, the available capacity is greater than the sum of the data used at the corresponding optical disk and the requested data, then the high watermark is automatically modified by an amount equal to the sum of the data used at the corresponding optical disk and the requested capacity, and the data is stored to the identical side of the optical disk in step s605.

Furthermore, if the available capacity is not greater than the sum of the data used at the corresponding optical disk and the requested data, then the data is stored to another available optical disk in step s606.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method for storing data by utilizing a plurality of optical disks designated as a logical storage volume, comprising the steps of:

inputting a storing mode of a given optical disk;

finding said given optical disk for which the storing mode is inputted;

appointing the storing mode to said given optical disk when said given optical disk is found;

storing appointed storing mode information for said given optical disk to a storage volume information database;

searching said storing mode information from said storage volume information database when a request to store data in said given optical disk is received;

determining a remaining capacity of said given optical disk according to said searched storing mode information; and storing data in said given optical disk when said given optical disk has remaining capacity.

2. The method as set forth in claim 1, wherein said data is stored in said given optical disk in accordance with said storing mode of said given optical disk, said data storing step comprising the steps of:

(a) storing data to a first side of said given optical disk;

(b) storing data to a second side of said given optical disk when said first side is filled with data; and (c) performing a sequential mode by searching a next optical disk in order to store data according to said steps (a) and (b) when the second side of said given optical disk is filled with data.

3. The method as set forth in claim 1, wherein said data is stored in said given optical disk in accordance with said storing mode of said given optical disk, said data storing step comprising the steps of:

(1) receiving a user request to store data in an optical disk in the logical storage volume;

(2) finding said optical disk in which to store said data on a first side thereof;

(3) storing said data on said first side of said found optical disk;

(4) finding a next optical disk in which to store said data on a first side thereof when the first side of said optical disk found in step (2) is full;

(5) finding an optical disk having a capability to store data on a second side thereof when the first sides of all of the plurality of optical disks are full;

(6) storing said data to the second side of said optical disk found in step (5);

(7) finding a next optical disk on which to store said data to the second side thereof when the second side of said optical disk found in step (5) is full;

(8) requesting the user to install additional optical disks when an optical disk is not found in steps (5) and (7); and (9) performing an interleaving mode repeating said steps (1) thru (8) when an optical disk is found in step (7).

4. The method as set forth in claim 1, wherein said step of determining the remaining capacity of said given optical disk comprises defining a threshold value indicating a storage restriction as a high watermark, and applying said high watermark to each of said plurality of optical disks.

5. The method as set forth in claim 4, wherein values of said high watermark are inputted by the user for each of said plurality of optical disks, and are stored in a storage media information database.

6. The method as set forth in claim 5, wherein the storing of said values of said high watermark in said storage media information database comprises the steps of:

inputting a value of the high watermark of said given optical disk;

searching for the given optical disk;

setting a value of the high watermark of said given optical disk to said inputted value of the high watermark when said given optical disk is found in said searching step; and storing said set value of the high watermark in said storage media information database.

7. The method as set forth in claim 4, wherein said step of storing data utilizes said high watermark and comprises the steps of:

receiving a request to store data in a requested capacity of said given optical disk;

comparing a capacity predefined by said high watermark to a sum of a used capacity of said given optical disk and said requested capacity;

storing data to said given optical disk and computing a new used capacity when the sum of the used capacity of said given optical disk and said requested capacity is less than the capacity predefined by said high watermark;

determining whether to append the data to a same document when the sum of the used capacity of said given optical disk and said requested capacity is not less than the capacity predefined by said high watermark;

storing data to another available optical disk when not appending data to the same document as a result of said step of determining whether to append the data to the same document;

comparing the sum of the used capacity of said given optical disk and the requested capacity to an available capacity of the optical disk when appending data to the same document as a result of said step of determining whether to append the data to the same document;

storing data to a further available optical disk when the sum of the used capacity of the optical disk and the requested capacity is not less than the available capacity of the optical disk; and modifying the high watermark with the sum of the used capacity and the requested capacity, and storing data to the optical disk when the sum of the used capacity of the optical disk and the requested capacity is not less than the available capacity of the optical disk.

8. A method for storing data by utilizing a plurality of optical disks designated as a logical storage volume, comprising the steps of:

(1) receiving a user request to store data in an optical disk in the logical storage volume;

(2) finding said optical disk in which to store said requested data to a side A of said optical disk;

(3) storing the requested data to the side A of said found optical disk;

(4) finding a next optical disk in which to store the requested data to the side A thereof when the side A of said optical disk is full;

(5) finding said optical disk having a capability to store data to a side B thereof when the sides A's of the plurality of optical disks are all full;

(6) storing data to the side B of said optical disk found in step (5);

(7) finding a next optical disk on which to store the requested data to the side B thereof when the side B of said optical disk found in step (5) is full;

(8) requesting the user to install additional optical disks when no more optical disks are found in steps (5) and (7); and (9) repeating said steps (1) to (8) when an optical disk is found in step (7).

9. A method for storing data utilizing optical disks, comprising the steps of:

(a) designating said optical disks as a logical volume;

(b) establishing, for each optical disk, a threshold value defining a data storage restriction for said each optical disk;

(c) defining a high watermark, corresponding to said threshold value established in step (b), for said each optical disk; and (d) using said high watermark for said each optical disk to determine available storage capacity of said each optical disk for storing data.

10. The method as set forth in claim 9, wherein step (d) comprises the steps of:

inputting a value of the high watermark for a given optical disk;

searching for said given optical disk;

designating said inputted value as an appointed high watermark of said given optical disk when said given optical disk is found in said searching step; and storing the appointed high watermark in a storage media information database.

11. The method as set forth in claim 9, wherein said step (d) comprises the steps of:

requesting to store data to a capacity of said each optical disk;

comparing a capacity predefined by said high watermark to a sum of a used capacity of said each optical disk and said requested capacity;

storing data in said each optical disk and computing a new used capacity when the sum of the used capacity of said each optical disk and said requested capacity is less than the capacity predefined by said high watermark;

determining whether to append data to a same document when the sum of the used capacity of said each optical disk and said requested capacity is not less than the capacity predefined by said high watermark;

storing said data to another available optical disk when not appending the data to the same document as a result of said step of determining whether to append data to a same document;

comparing the sum of the used capacity of said optical disk and the requested capacity to the available capacity of said each optical disk when appending the data to the same document as a result of said step of determining whether to append data to a same document;

storing data to a further available optical disk when the sum of the used capacity of said each optical disk and the requested capacity is not less than the available capacity of said each optical disk; and modifying the high watermark with the sum of the used capacity of said each optical disk and the requested capacity, and storing the data to said each optical disk when the sum of the used capacity of said each optical disk and the requested capacity is not less than the available capacity of said each optical disk.

12. The method as set forth in claim 11, wherein said high watermark for said each optical disk is stored to a storage media information database.

13. The method as set forth in claim 8, further comprising the step, prior to step (1), of inputting a storing mode of a given optical disk.

14. The method as set forth in claim 13, further comprising the step, prior to step (1) but after the inputting step, of finding said given optical disk for which the storing mode is inputted.

15. The method as set forth in claim 14, further comprising the step, prior to step (1) but after the finding step, of appointing a storing mode to said given optical disk when said given optical disk is found.

16. The method as set forth in claim 8, further comprising the step, prior to step (1), of storing appointed storing mode information for said given optical disk to a storage volume information database.

17. The method as set forth in claim 16, further comprising the step, prior to step (1) but after the storing step, of searching said storing mode information from said storage volume information database when a request to store data in said given optical disk is received.

18. The method as set forth in claim 17, further comprising the step, prior to step (1) but after the searching step, of determining a remaining capacity of said given optical disk according to said searched storing mode information.

* * * * *